United States Patent [19]

Swanson et al.

[11] 4,404,505
[45] Sep. 13, 1983

[54] PROGRAMMABLE MULTIPLE POSITION MACHINE

[75] Inventors: Douglas L. Swanson, McKean; Ronald K. Turk, Erie, both of Pa.

[73] Assignee: Swanson Systems, Inc., Erie, Pa.

[21] Appl. No.: 240,146

[22] Filed: Mar. 3, 1981

[51] Int. Cl.³ .............................................. G05B 13/00
[52] U.S. Cl. .................................... 318/561; 318/603; 198/859
[58] Field of Search ........................ 198/341, 345, 859; 318/561, 603

[56] References Cited

U.S. PATENT DOCUMENTS

| | | | |
|---|---|---|---|
| 3,699,555 | 10/1972 | Du Vall | 340/174.1 |
| 3,700,379 | 10/1972 | Robertson | 444/1 |
| 3,729,668 | 4/1973 | Brette | 318/561 |
| 3,731,177 | 5/1973 | Commander | 318/603 |
| 3,739,158 | 6/1973 | Woodward | 235/151.11 |
| 3,748,563 | 7/1973 | Pomella | 318/573 |
| 3,749,996 | 7/1978 | Pomella | 318/571 |
| 3,809,986 | 5/1974 | Visser | 318/561 |
| 3,835,360 | 9/1974 | Kiwiet | 318/561 |
| 3,893,616 | 7/1975 | Trousdale | 235/151 |
| 3,914,677 | 10/1975 | MacWade | 318/561 |
| 4,031,442 | 6/1977 | Poppelreiter | 318/561 |
| 4,031,443 | 6/1977 | Droux | 318/561 |
| 4,066,941 | 1/1978 | Foster | 318/341 |
| 4,099,112 | 7/1978 | Klinger | 318/561 |
| 4,103,314 | 7/1978 | Case | 360/78 |
| 4,143,310 | 3/1979 | Fujinawa | 318/571 |
| 4,355,273 | 10/1982 | Du Vall | 318/561 |

Primary Examiner—B. Dobeck
Attorney, Agent, or Firm—Hume, Clment, Brinks, William & Olds, Ltd.

[57] ABSTRACT

A multiple position programmable movement machine including movable transfer means; means for producing signals indicating the actual position of the transfer means; drive means coupled to the transfer means for moving the transfer means; and programmable electronic control means for the drive means to position the transfer means at a plurality of selected positions. The control includes segmented velocity-position profile means to produce velocity profile outputs in response to actual position signals and modification signal generation means for producing a modification signal at about the final velocity-position segment to correct differences between the actual and selected positions of the transfer means.

6 Claims, 6 Drawing Figures

PROGRAMMABLE MULTIPLE POSITION MACHINE

BACKGROUND OF THE INVENTION

The present invention relates to a programmable movement, multiple position machine, and in particular to such a machine which by its electronically programmable control accomplishes multiple position movement in a pre-defined, carefully controlled but easily adjustable fashion. The apparatus of the present invention can be used, for instance, as an assembly machine or a material moving or handling machine for the transferring of work between stations, machine operations, or automatic work handling devices.

Prior art work transfer and positioning devices in the assembly machine field have included multiple position indexers and indexing machine chassis. Indexers and indexing machine chassis have widespread commercial application to relatively high speed multiple position production machines. Such machines are typically "dedicated" to one task or set of tasks, and are used for such operations as multiple position machining, testing, heating, cooling, and assembly. One of the more common lines of indexers and indexing machine chassis utilize a cam to translate continuous motor input to intermittent output motion which in turn moves and stops a series of work handling fixtures or work positions themselves. The number of output positions of such a drive are typically not variable, but are fixed by the relationship of the cam to its driven components.

One particular type of multiple position production machine is a rotary assembly machine, such as disclosed in U.S. Pat. Nos. 2,921,478, 3,065,530 and 3,231,968, assigned to the assignee of the present invention, and includes an indexer for a rotary table which is moved or indexed in a number of selected increments. As the table is indexed in the various increments, assembly or test processes are performed on parts resting on the table. The assembly machine can also be of the in-line variety, having a continuous or articulated belt or articulated links on which the part to be worked on is also intermittently indexed through a number of work stations.

An indexer associated with such a rotary assembly machine is the apparatus that moves the rotary table incrementally. Such an indexer is typically actuated mechanically by a motor driven cam. The cam is so shaped that it engages and imparts motion to a series of followers in order to rotate the table during a particular portion of the rotation of the cam, and then disengages from the followers, or the cam is shaped so that it no longer imparts displacement motion to such followers, so that the table dwells or remains at a fixed position during another period of rotation of the cam. The dwell period may be a major portion of the cam rotation cycle period.

In order to accomplish the required precise movements, the cam that controls the indexer must be cut carefully and to an exactly prescribed design. In these mechanically controlled indexers of the prior art, such as disclosed in U.S. Pat. Nos. 2,887,209, 2,921,478, 2,990,940, and 3,039,597, assigned to the assignee of the present invention, a new cam must be used for each type of indexing motion desired. Typical indexers of the prior art do not require variable acceleration, direction of motion, and length of travel indexing, so a mechanical cam control of indexing is satisfactory. The utility of such indexers is, however, limited because of the difficulty of mechanically changing the cam design so as to provide adjustable incremental motion for various operations. Therefore, cam driven indexers associated with such prior art machines have limited utility for variable work transfer applications.

Within recent years, automatic parts handling machines have been developed that are commonly called "robots." Such robots can perform a number of movements with respect to a work piece; they may also move the work piece to its work place and remove it from the work place. The mechanical hands of such robots may grasp, rotate, and operate a work piece. The proliferation of such robot technics has required the use of more versatile and sophisticated work transfer machines to bring the work to and take the work from the robot location, and have heightened the need for an apparatus such as the present invention, i.e., one that accomplishes multiple position movement in a pre-defined, carefully controlled but easily adjustable fashion.

SUMMARY OF THE PRESENT INVENTION

According to the present invention, there is provided an apparatus, that is, a multiple position programmable movement machine, that overcomes the limitations and disadvantages of the prior art. The machine of the present invention includes a transfer means mounted for incremental movement, and means for producing signals indicating the actual position of the work transfer means. One preferred embodiment of the transfer means is a rotary table for advancing items on which work is to be performed.

Coupled to the transfer means is a drive means for moving the transfer means in an incremental fashion. The actual incremental movement of the transfer means, including the velocity, acceleration, and actual distance moved, is accomplished by a programmable electronic velocity control means. This electronic control means operates on the drive means to position the transfer means at a plurality of selected positions.

According to a preferred embodiment of the present invention, the electronic control means includes a segmented velocity-position profile means which produces a velocity profile output corresponding to a particular velocity-position segment in response to the actual position of the transfer means. The electronic control means also includes an error limit circuit that acts at about the final velocity-position segment to limit the magnitude of a position difference signal that corrects differences between the actual and selected positions of the transfer means.

Thus, according to the present invention, the movement of the transfer means through a desired cycle and the incremental components of motion are controlled by a planned plurality of velocities approximating a desired velocity-position curve. The actual position of the transfer means is used to trigger selected velocity and acceleration information as certain breakpoints or transitions between segments along the profile are reached. The actual position is compared with a predetermined requested position and a limit imposed towards the end of the movement cycle to produce a modification signal to compensate for differences between the planned velocity-position profile and actual movement of the work transfer means.

The machine of the present invention has a variety of wide applications, and is not intended to be limited to a specific work transfer, machining, testing, assembling or other sequential manufacturing environment. It could be used to interface with other machines to provide a more sophisticated work transfer means than that used in the prior art. It can also be used to accomplish sophisticated work transfer in order to function as a multiple parts conveyor in a rotary, linear or other configuration. A linear configuration is provided by connecting a conveyor for separate pallets in a recirculating fashion around a support, with a work transfer means mounted at one or more ends to provide incremental motion of the pallet conveyor having multiple work holders to one or more positions.

The programmable electronic velocity control may be provided by a microprocessor, a minicomputer, assorted gate logic hardware, a programmable controller such as a Modicon brand type 464, or other such additional hardware. The control is accomplished in accordance with a defined set of distances, timing, acceleration, deceleration, and velocity of a multiple number of pallets or other work or fixture holding devices. The apparatus of the present invention may be used to receive parts, to perform operations on parts, to carry or transfer parts, and so on. It can thus be seen that the apparatus of the present invention is significantly more flexible in use than prior art apparatus. It provides a variety of desirable work transfer modes, distances of movement, velocity rates, and acceleration and deceleration patterns, depending on the programmable information provided in the electronic control package.

These and other objects, advantages and features of the present invention will become apparent upon a reading of the detailed description of the preferred embodiments below in conjunction with the accompanying drawings.

DETAILED DESCRIPTION OF THE PREFERRED EMBODIMENTS

Figure 1:
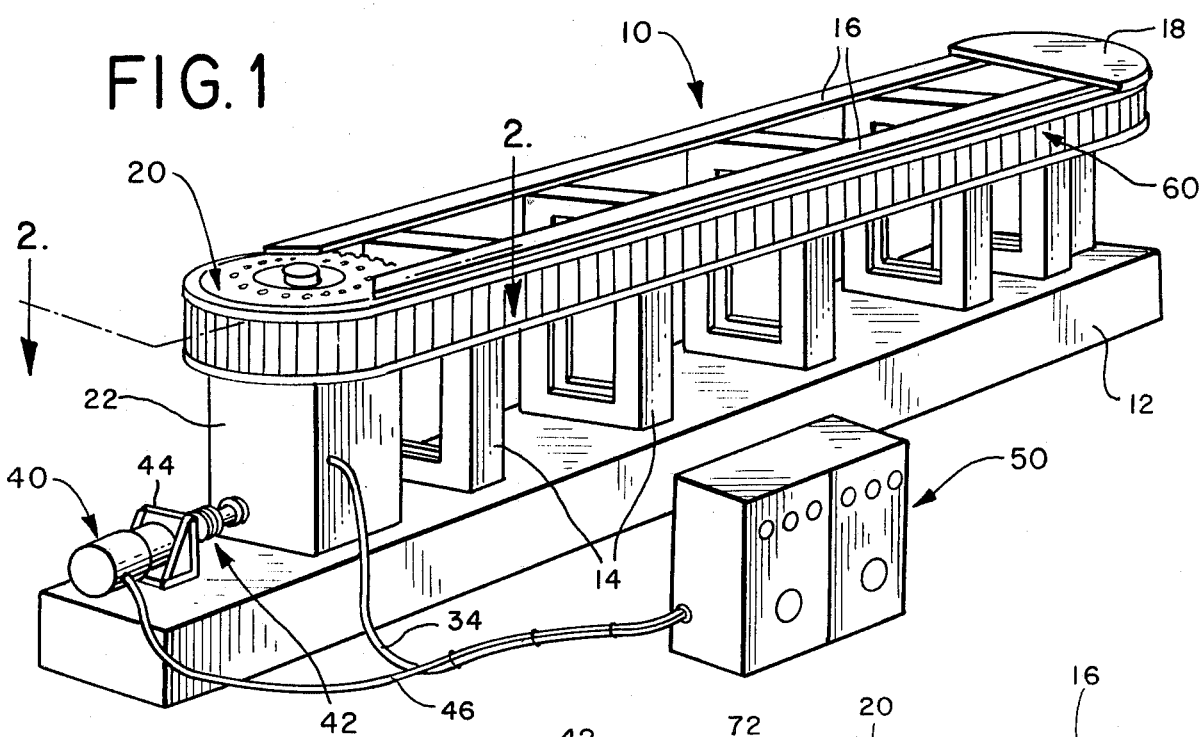
FIG. 1 is a perspective view of a linear embodiment of a multiple position programmable movement machine of the present invention, including a horizontal pallet conveyor.
Figure 2:
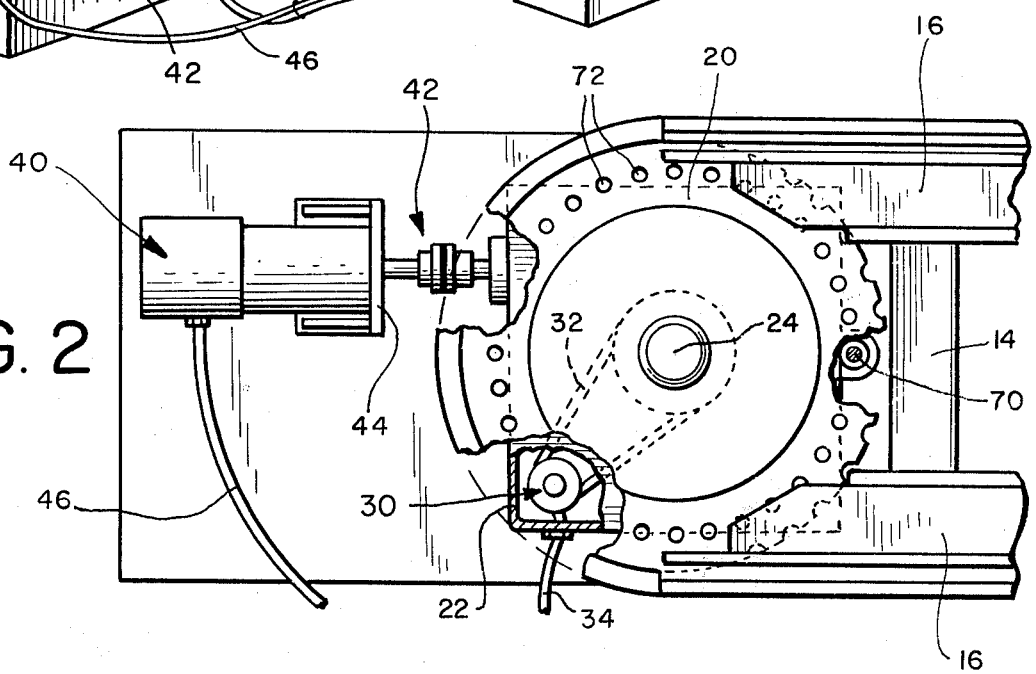
FIG. 2 is a plan view of the linear multiple position programmable movement machine of FIG. 1 taken along line 2—2.

Referring now to FIGS. 1 and 2, there is shown a preferred linear embodiment of the multiple position programmable movement machine of the present invention, indicated generally in FIG. 1 by reference numeral 10.

The linear multiple position programmable movement machine 10 includes a rotary transfer table 20, a positioning encoder 30 connected to a drive shaft 24 for the rotary transfer table 20, a drive motor 40 for the rotary transfer table 20, a programmable control 50, a pallet means 60, and a positioning device 70. Each of these elements cooperates to produce a machine which intermittently moves a transfer table so that the pallets 60 are advanced at intervals in a generally linear fashion around the periphery of the machine 10.

The pallets 60 are supported around the periphery of the machine 10 on a conveyor or link connector, with the rotary transfer table 20 at the driving end and an end support 18 at the dummy end, which permits the pallet links to recirculate the machine 10 under the driving influence of the moving rotary transfer table 20. Upper support plates 16 provide additional support for the linked arrangement of the pallets 60. The upper support plates 16 rest on samsons 14 mounted on a support block 12.

The rotary transfer table 20 is supported by a housing 22 and is rotated by a drive shaft 24. While not shown with particularity in FIGS. 1 or 2, the drive shaft 24 is suitably connected to the drive motor 40 and its motor drive train 42 by means of a worm gear arrangement, such as indicated by reference numeral 148 in FIG. 4. Alternatively, the gear arrangement may be a pair of bevel gears, a pair of helical gears meshed with axes at a 90° angle, or any such suitable speed reducing arrangement. The drive train 42 is a suitable drive train as is known in the art.

The rotary transfer table 20 is maintained in selected positions of rotary movement by a positioning device 70 which engages positioning holes 72 in the rotary transfer table 20. In order to measure the actual position of the rotary transfer table 20, an encoder 30 is coupled to the drive shaft 24 of the rotary transfer table 20 by means of a encoder pulley 32. The encoder 30 is calibrated with the positions of the positioning hole 72 or other markings on the rotary transfer table 20 so as to produce a signal corresponding to the rotary position of the rotary transfer table 20. As best seen in FIG. 2, the outer periphery of the rotary transfer table 20 has notches provided to engage inner surfaces of the linked pallets 60 to advance the pallets 60 as the rotary transfer table 20 is turned about its axis.

Figure 3:
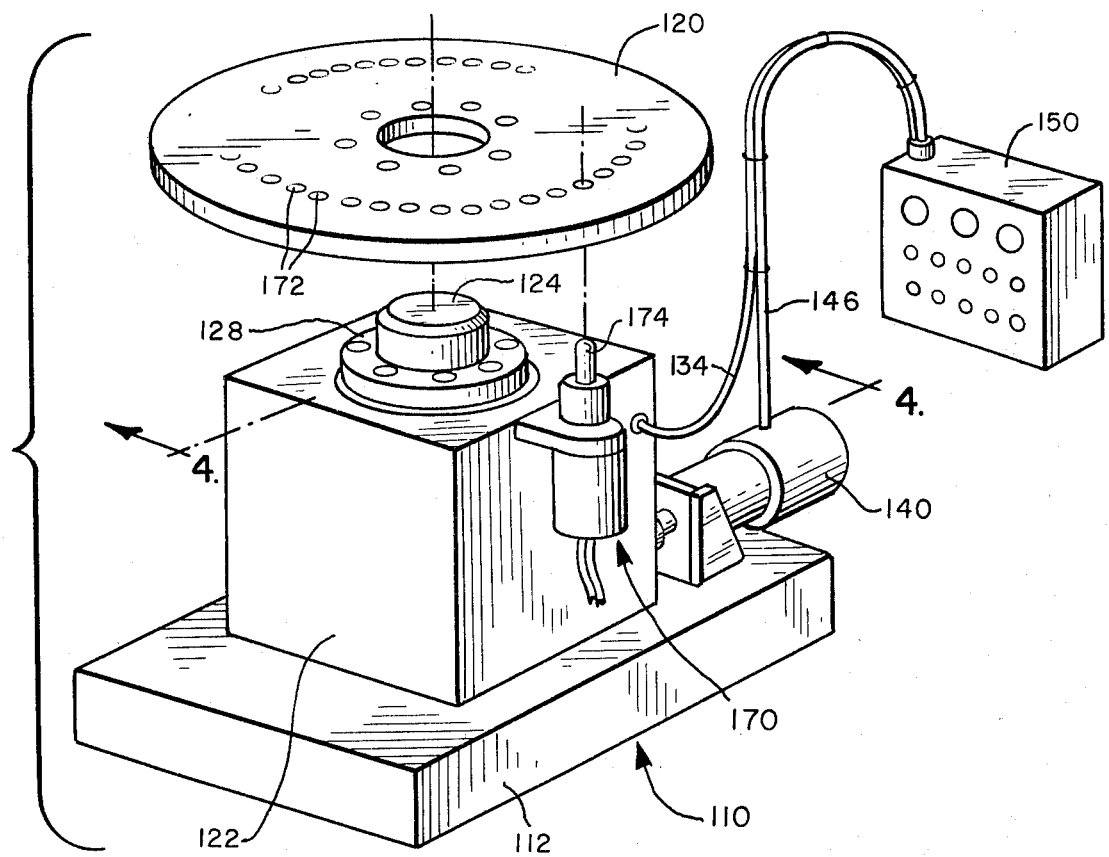
FIG. 3 is a partially exploded view of a rotary embodiment of a multiple position programmable movement machine of the present invention.
Figure 4:
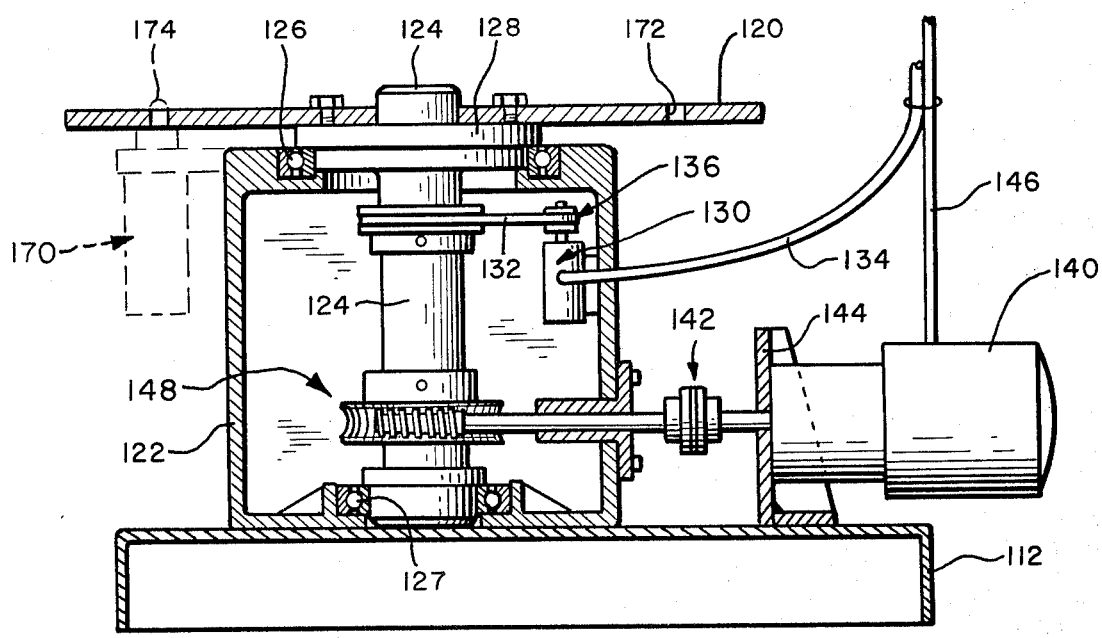
FIG. 4 is a partially sectioned view of the rotary multiple position programmable movement machine of FIG. 3, illustrating the work transfer table, drive motor, and associated support and linkage, and taken through line 4—4 of FIG. 3.

FIGS. 3 and 4 show an alternative embodiment of the present invention, a rotary multiple position programmable movement machine indicated generally by reference numeral 110. This machine is similar to a portion of the linear embodiment of the machine shown in FIGS. 1 and 2. The rotary machine 110 includes a rotary transfer table 120, a position encoder 130, a drive motor 140, a programmable control 150, and a positioning device 170. The rotary transfer table 120 is mounted onto a mounting plate 128 and around the drive shaft 124. The mounting plate 128 and the drive shaft 124 are welded or joined by some suitable means to provide a unitary drive connection with the rotary transfer table 120. The drive shaft 124 is supported for rotation in the support housing 122 by means of an upper support bearing 126 and a lower support bearing 127.

As can be seen in FIG. 3 and phantom lines in FIG. 4, a positioning means 170 is provided with a type of locating, positioning and holding device to secure the rotary transfer table 120 in a desired position. A pin 174 fits within any one of the positioning holes 172 to secure the rotary transfer table 120. The positioning means 170 is of course engaged only when the drive motor 140 is not operating to move the rotary transfer table 120. The position encoder 130, connected to the drive shaft 124 through a drive belt 132 wrapped around the encoder shaft and pulley arrangement 136, provides an absolute measure of actual position of the rotary transfer table 120. The signal produced by the encoder 130 travels along encoder signal line 134 to the programmable control 150 to provide the positioning information used as set forth below. Also, the motor drive signal line 146 comes from the programmable control 152 and energizes the drive motor 140 in a fashion as described below.

The motor support 144 provides necessary support for the drive motor 140 adjacent the drive train 142 so that the worm gear arrangement 148 operates to rotate the drive shaft 124. The drive train 142 is of the standard variety as is known in the art, and the worm gear arrangement 148 may be replaced by any suitable speed reducing arrangement, such as worm or bevel gear arrangements, as discussed above. All the components of the rotary machine 110 rest on a support base 112.

Figure 6:
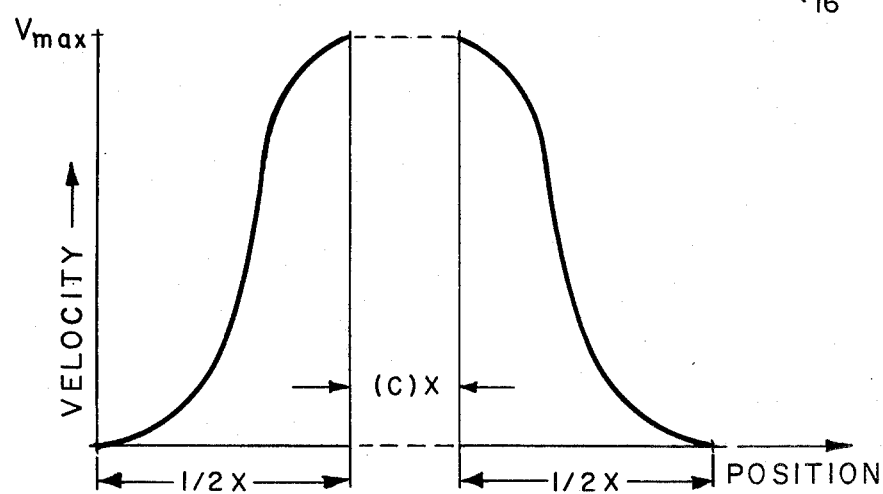
FIG. 6 is a curve showing the relationship of velocity to position during a typical cycle of rotation of the work transfer table according to the present invention.
Figure 5:
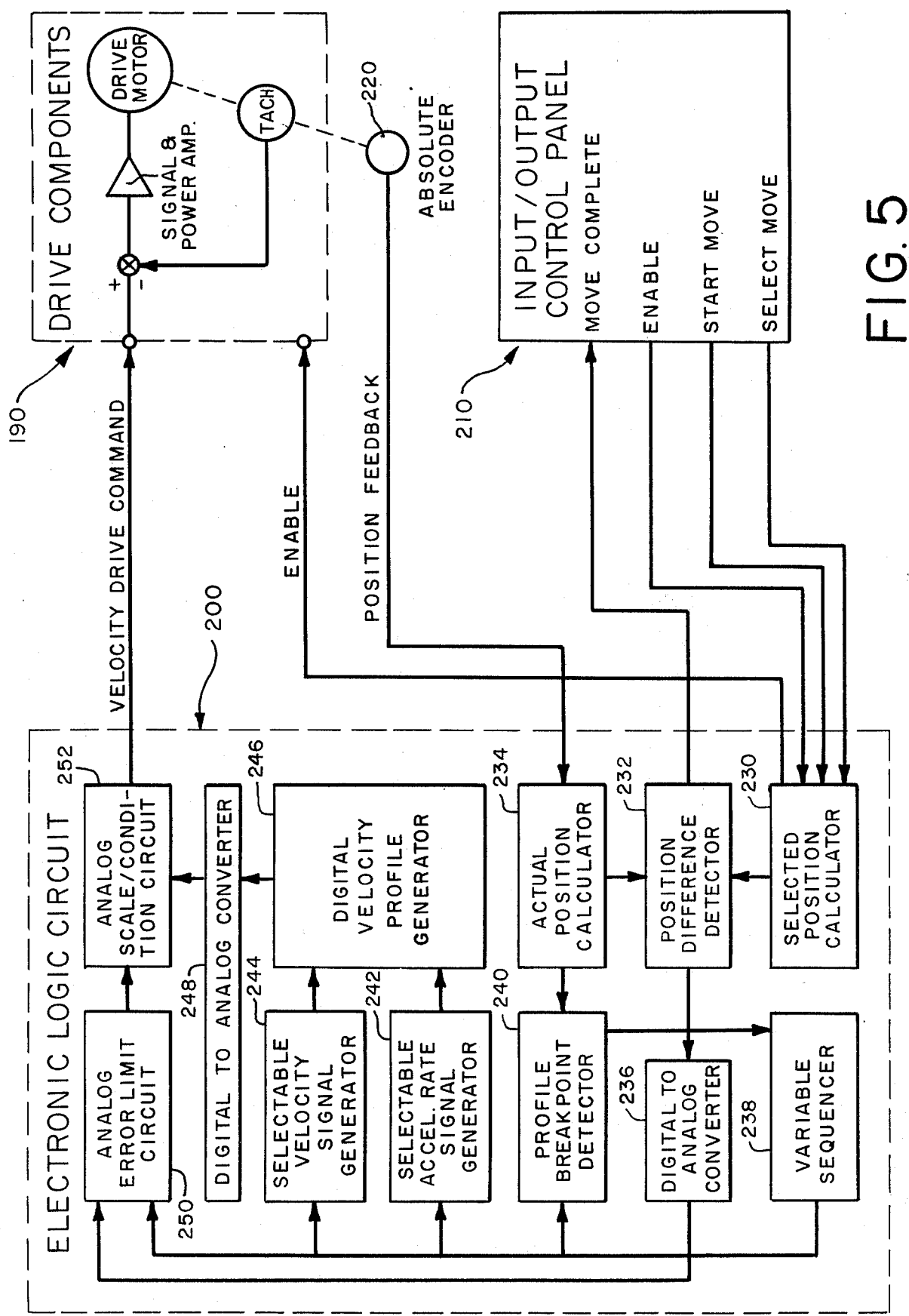
FIG. 5 is a detailed block diagram of the programmable electronic control of the present invention applicable to both the linear and rotary embodiments, and including an input and output control panel, an electronic logic circuit, and a drive component schematic.

Referring now to FIG. 5, there is shown a schematic or block diagram view of the drive components 190, the electronic logic circuit 200, and the input and output control panel 210 that make up the programmable controller 150 and drive motor 140 combination for the embodiments of FIGS. 1 through 4. FIG. 6 shows a graph of velocity versus position that illustrates one of the basic working concepts of the programmable control of the present invention. It is advantageous for the velocity versus position curve of the rotary transfer table 20 or 120 to approximate a bell curve for both the acceleration and deceleration phases of movement of the rotary transfer table 20 or 120. However, in other embodiments of the present invention, the control can be programmed to produce motion of the rotary transfer table 20 or 120 in a fashion different from the velocity versus position curve of FIG. 6.

In FIG. 6 the segment to the left identified by $\frac{1}{2}$ X is the acceleration portion and the portion to the right identified by $\frac{1}{2}$ X is the deceleration segment. The position X is the smallest incremental distance that the rotary transfer table 20 or 120 is desired to be advanced. For instance, in FIGS. 2 or 3, that distance is the distance between adjacent positioning holes 72. Longer moves can be made by causing the rotary transfer table 20 or 120 to rotate at a constant velocity $V_{max}$ for a distance identified by (C)X on the graph, where C is an integer greater than or equal to zero, and X is the smallest distance desired to advance the rotary transfer table 20 or 120. The value C will be one less than the number of increments of the smallest desired rotary transfer table advancing distance. For instance, if one desires to advance the rotary transfer table 20 or 120 three positions, the dwell distance (C)X will be 2X.

The programmable controller 50 or 150 that accomplishes this controlled motion of the transfer table is shown in FIG. 5. Block 210 is the input and output control panel having a display indicator showing that the requested move of the rotary transfer table 20 or 120 is complete, and also including an enabling switch, a switch to start the move of the rotary transfer table 20 or 120, and a switch to select that particular one of the moves desired for the rotary transfer table 20 or 120.

The three inputs of enable, start move, and select move are fed into the selected position calculator 230 of the electronic logic circuit 200. In short, the programmable electronic logic circuit 200 includes a segmented velocity-position profile stored in a profile breakpoint detector 240 that produces velocity profile outputs through a digital velocity profile generator 246 in response to actual position signals from an actual position calculator 234. Furthermore, an analog error limit circuit 250 provides a modification signal at about the final velocity-position segment to correct any differences between actual and selected positions of the work transfer table 20 or 120. The drive components 190 include a drive motor connected to a signal and power amplifier, and feedback monitor or servocontrol with a tachometer that adjusts the speed of the drive motor after measuring it to be sure that it is at the right level. An absolute encoder 220, corresponding in physical representation to reference numerals 30 or 130, provides position feedback information to the actual position calculator 234.

The velocity-position profile is stored in the profile breakpoint detector 240 in the form of position setpoints relating to segments on a desired velocity-position curve. In a preferred embodiment, the velocity-position curve approximates the bell curve of FIG. 6 and is divided in its acceleration portion into eight segments and in its deceleration portion into eight segments. Other suitable velocity-position curves may be designed for other types of movement. A variable sequencer 238 can operate to sequence up the eight segments, dwelled for any desired increment of distance (C)X, and then sequence downward through the eight segments. It is believed that for purposes of obtaining precise control over the rotary transfer table 20 or 120, eight segments approximating each one-half of the velocity curve are sufficient.

According to the present invention, the analog error limit circuit 250 effectively only operates when triggered by the variable sequencer 238 within the last of eight segments of the deceleration portion of the velocity profile. By knowing the relationship between velocity and position shown in FIG. 6, a table of velocity values for the rotary transfer table 20 or 120 as a function of position can be computed. The analog error limit circuit 250 limits the magnitude of the position difference signal from the position difference detector 232 that corrects differences between the actual and selected positions of the transfer means during the last segment of the velocity profile. A fine-tuning adjustment or modification signal is then fed from the error limit circuit 250 to the drive motor 40 or 140.

In detail, the operation of the electronic logic circuit is as follows. The signals from the input and output control panel 210 are fed into the selected position calculator 230. A digital selected position signal is produced by the selected position calculator 230 and fed into a position difference detector 232. The other input to the position difference detector 232 comes from the actual position calculator 234 into which an absolute encoder 220 feeds the actual position of the rotary transfer table 20 or 120.

The digital actual position signal and the digital selected position signal are both input to a position difference detector 232 which computes the difference between the position signals and produces a resultant position difference signal which is fed to a digital-to-analog converter 236. The output of the converter 236 then becomes an input to the analog error limit circuit 250. The digital actual position signal from the actual position calculator 234 is also fed into a profile breakpoint detector 240. The detector 240 contains position setpoints based upon a segmented velocity profile for the incremental motion sequence for rotating a transfer table 20 or 120, and produces a series of trigger signals, corresponding to endpoints of the velocity segments.

Each trigger signal is fed while the actual position signal indicates the position within that particular velocity segment to a variable sequencer 238. The variable sequencer 238, after noting the particular velocity-position segment in which the rotary transfer table 20 or 120 is located, selects the corresponding acceleration rate in the selectable acceleration rate signal generator 242 and the corresponding velocity in the selectable velocity signal generator 244. In other words, the selectable acceleration rate signal generator 242 is responsive to each trigger signal to produce a corresponding acceleration rate signal and the selectable velocity signal generator 244 is responsive to the trigger signal to produce a corresponding velocity signal.

These velocity and acceleration rate signals are fed into a digital velocity profile generator 246 that produces a velocity profile output that changes at a rate provided by the selectable acceleration rate signal. This velocity profile output is fed through a digital analog converter 248 and input to a scaling means 252 indicated as the analog scale/condition circuit. The analog error limit circuit 250 is responsive to the analog position difference signal and to the variable sequencer 238 so that it operates during the last velocity segment to check the difference between the actual position of the work transfer table 20 or 120 and the requested position of the work transfer table 20 or 120 and to limit the magnitude of the change to the planned velocity profile output. The analog error limit circuit 250 produces a modification signal input to the scaling means 252. The scaling means 252 sums the analog velocity profile output and the modification signal, converts them to the appropriate scale for the drive component 190, and produces a drive velocity command to the drive components that operates, while the enable input to the drive components is present, to rotate the drive motor at the appropriate level to accomplish rotation of the rotary transfer table 20 or 120.

While the elements shown in FIG. 5 are schematically represented in a block form, suitable elements separately known in the art can be provided to accomplish the functions of some of the elements, at least for the drive components and encoder. For instance, the preferred signal and power amplifier is a Control Systems Research motor driver no. NC 540, the preferred motor tachometer is a PMI Motors Corp motor tachometer part no. MC27P, and the preferred encoder is a Computer Conversions Corporation part no. HDSM999-625-USEC.

Though the embodiments described and disclosed above are preferred, other embodiments and refinements which do not part from the true spirit and scope of the present invention may be conceived by those skilled in the art. It is intended that all such embodiments and refinements be covered by the following claims.

We claim:

1. A multiple position programmable movement machine comprising:
   work transfer means mounted for incremental movement;
   a drive shaft supporting said work transfer means;
   drive means coupled to said work transfer means through said drive shaft for driving said work transfer means, said drive means including a servo-controlled drive motor;
   encoder means coupled to said work transfer means to determine the actual position of said work transfer means;
   control panel including means for selecting a plurality of rotary positions at which the work transfer means can be positioned; and
   means for producing a drive velocity command to said drive motor to cause controlled incremental movement of said work transfer means including:
      means, responsive to said encoder means and to said position selecting means, for producing a position difference signal indicating the difference between a selected position and the actual position of the work transfer means;
      means, responsive to said encoder means, for triggering a variable sequencer to sequence along a profile breakpoint detector, a selectable acceleration rate signal generator, and a selectable velocity signal generator, thereby producing a plurality of paired velocity and acceleration signals;
      velocity profile generation means, responsive to said velocity and acceleration signals for producing a velocity profile output;
      means, responsive to said variable sequencer and to said position difference signal, for limiting the magnitude of the position difference signal and for producing a resulting modification signal; and
      scaling means for receiving said velocity profile output and said modification signal to produce a scaled drive velocity command to said servo-controlled drive motor.

2. A multiple position programmable movement machine comprising:
   a work transfer means mounted for rotary movement;
   a drive shaft coupled to said work transfer means;
   a servo-controlled drive motor coupled to said work transfer means through said drive shaft so that controlled operation of said drive motor causes controlled rotation of said work transfer means;
   means coupled to said drive shaft for determining the actual rotary position of said work transfer means and producing an actual position signal;
   a control panel including means for selecting a plurality of desired rotary positions for the work transfer means and producing a selected position output;
   a selected position calculator for receiving said selected position output and producing a digital selected position signal;
   an actual position calculator for receiving said actual position signal and producing a digital actual position signal;
   a position difference detector responsive to said selected position signal and said actual position signal to compute the difference between said position signals and produce a resultant position difference signal;
   a digital-to-analog converter responsive to said position difference signal to convert said signal to an analog position difference signal;
   a profile breakpoint detector containing position setpoints for the incremental rotary motion sequence of the work transfer means, and producing trigger signals corresponding to the endpoints of each velocity segment;
a selectable acceleration rate signal generator responsive to each of said trigger signals and producing corresponding acceleration rate signals;
a selectable velocity signal generator responsive to each of said trigger signals and producing corresponding velocity signals;
a digital velocity profile generator responsive to said acceleration rate signal and to said velocity signal for producing a velocity profile output;
means for connecting said digital velocity profile output to an analog velocity profile output;
means, responsive to said analog position difference signal and to said variable sequencer, for limiting the magnitude of the position difference signal and for producing a resulting modification signal; and
scaling means for receiving said analog velocity profile output and said modification signal to produce a scaled drive velocity command to said servo-controlled motor.

3. The machine of claims 1 or 2 further comprising a worm gear connection between said drive shaft and said drive motor.

4. The machine of claims 1 or 2, further comprising releaseable positioning means for locking said transfer means in a selected position.

5. The machine of claims 1 or 2, further comprising a recirculating pallet means coupled to said work transfer means and including a plurality of pallets upon which work items can be mounted, and means for supporting said pallet means to permit recirculating motion thereof.

6. The machine of claim 2 wherein said work transfer means is a work transfer table, and further comprising a recirculating pallet means engaging said work transfer table and including a plurality of pallets upon which items can be mounted, and means for supporting said pallet means to permit recirculating motion of said pallet means, so that items can be placed on said pallet means and incrementally transferred by said pallet means.

* * * * *